June 16, 1942.    I. TOGUT    2,286,394
ELECTRIC BARBECUE BROILER
Filed March 29, 1941    2 Sheets-Sheet 1

ISIDORE TOGUT
INVENTOR.
BY Irving Seidman
ATTORNEY.

June 16, 1942.  I. TOGUT  2,286,394
ELECTRIC BARBECUE BROILER
Filed March 29, 1941    2 Sheets-Sheet 2
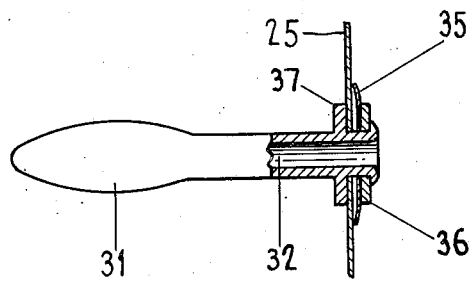
Fig. 3
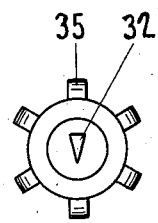
Fig. 4
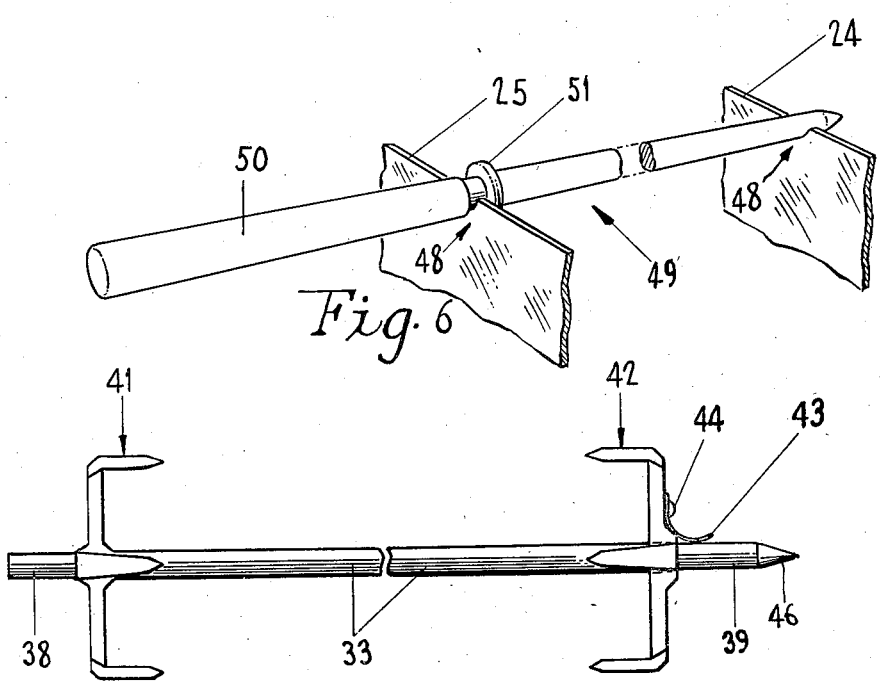
Fig. 6
Fig. 5
ISIDORE TOGUT
INVENTOR.
BY Irving Seidman
ATTORNEY.

Patented June 16, 1942

2,286,394

UNITED STATES PATENT OFFICE 2,286,394

ELECTRIC BARBECUE BROILER

Isidore Togut, New York, N. Y.

Application March 29, 1941, Serial No. 385,780

5 Claims. (Cl. 219—35)

This invention relates to an electric oven and barbecue-type broiler wherein a fowl may be secured to a skewer and rotatably adjusted to various angular positions and broiled by direct application of heat from electric heating elements.

An object of this invention is to provide a container having an opening at one end and electric heating elements vertically secured on opposite walls thereof, and having a tray removablly positioned between the heating elements and adapted for supporting a fowl to be broiled in said container, the fowl remaining supported when inside or outside of the container, when removed for inspection.

Another object of this invention is to form the tray with two vertical plates, one of the plates being adapted to substantially close the opening in the container except an upper vent for the exit of vapor from the broiler.

Another object of this invention is to suspend meat from a skewer supported by the two vertical plates of the said tray, the meat being held equidistant between the heating elements so that the meat will broil simultaneously and equally on both sides.

Another object of this invention is to provide a hollow handle having a non-circular opening adapted to receive one end of a skewer or elongated piercing element in interengagement for rotating the skewer.

Another object of this invention is to provide spring means for holding the handle in tensioned relation with the front plate of the tray whereby the handle may be adjusted to various angular positions and adapted to support a fowl eccentrically thrust on the skewer for broiling.

With the above and other objects in view, the invention will be hereinafter more particularly described, and the combination and arrangement of parts will be shown in the accompanying drawings and pointed out in the claims which form part of this specification.

Reference will now be had to the drawings, wherein like numerals of reference designate corresponding parts throughout the several views, in which:

Figure 3 is an enlarged fragmentary cross-sectional view of the handle and a spring device causing resilient engagement of the handle and the front plate of the tray.

Figure 4 is a front elevation of the handle, looking from inside the tray.

Figure 5 is a fragmentary side view of an adjustable spit or skewer forming part of the device.

Figure 6 is an enlarged fragmentary view of a skewer supported at the upper portion of the tray.

Figure 1:
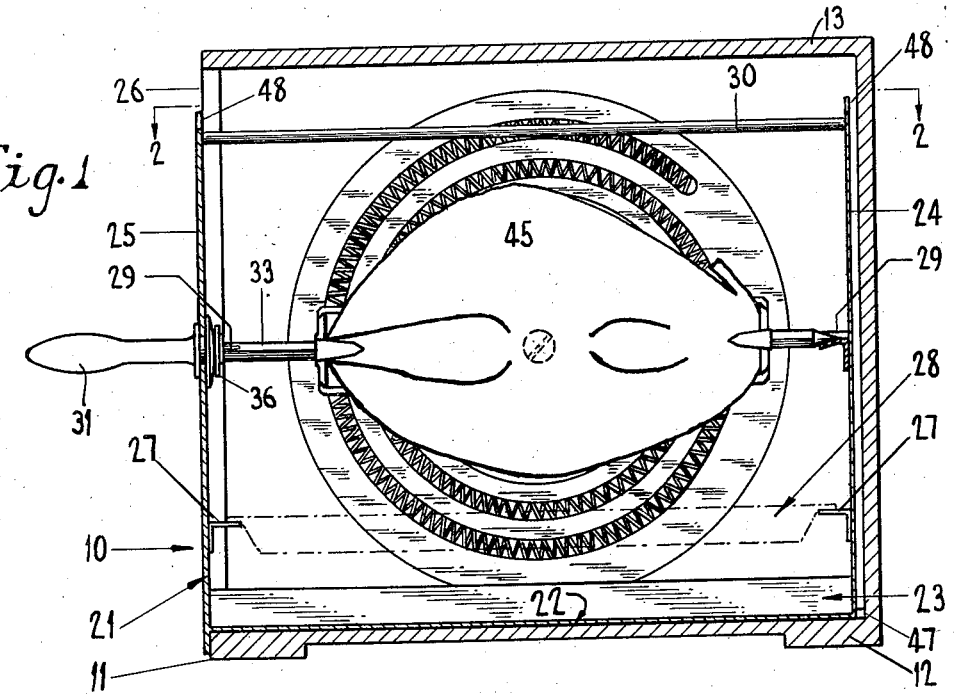
Figure 1 is a cross-sectional view of the device, the section being taken as on line 1—1 in Figure 2.

In the illustrated embodiment of the invention, the numeral 10 indicates the electric oven and barbecue-type broiler comprising a casing or container 11 having a rectangular cross-section and of a size to accommodate a chicken or the like.

The casing 11 has a bottom 12, a top 13, side walls 14, an end wall 15, and an opening 16 in the front wall 17. Electric heating elements 18 have been secured to the side walls 14 by screws 19. The numeral 20 designates plug terminals which are adapted to be connected to the heating elements in any suitable manner.

The broiler 10 is provided with a tray 21 movable to and from position between the heating elements 18 and through the opening 16 in the casing 11. The tray 21 has a sheet metal base 22, the side edges of which are turned upwardly so as to form a drip pan 23. The tray 21 has a vertical rear plate 24 and a vertical front plate 25 which is wider than the opening 16 and overlaps the front wall at the sides and bottom of the casing. The front plate 25 is of smaller height than the opening 16 and leaves a vent 26 for exit of vapor from the broiler.

The plates 24, 25, have a lower set of brackets 27 fastened thereto in any suitable manner. The brackets 27 have their upper faces in alinement and serve to support a pan 28 on the tray 21. The plates also have a set of brackets 29 fastened thereto at an upper elevation. The brackets 29 have their upper faces in alinement and serve for supporting a pan of the type of pan 28 (not shown). Tie rods 30 serve to hold the plates 24 and 25 together.

A hollow handle 31 has been rotatably mounted on the front plate 25 and serves for moving the tray into and out of the broiler 10. As shown in Figure 3, the handle 31 has an opening 32 lengthwise thereof. The cross-sectional contour of the opening 32 is substantially triangular so as to receive one end of a skewer or piercing element 33 in aligned and supported relation. One of the upper brackets 29 in the tray 21 has an opening 34 to permit an annular and concave spring washer 35 to be mounted on the inner end of the handle 31. A rigid flat annular washer 36 on the end of the handle 31 is clinched against and compresses the spring washer 35. The compressed spring washer presses against the inner surface of the front plate 25 while a collar 37 integral with the handle is resiliently pressed against the outer surface of the front plate 25. The handle is thus resiliently held in frictional engagement with the front plate 25.

One end 38 of the elongated piercing element 33 is of a cross-sectional contour adapted to fit into the opening 32. The opposite end 39 of the piercing element 33 tapers into a sharp point. The end 39 is designed to be received in a tapering recess 40 centrally of one of the brackets 29 and supported in horizontal relation and parallel with the heating elements 18.

The piercing element 33 carries two sets of pointed prong heads 41, 42, one or both of which may be slidably mounted. The prongs extend towards each other. When the prong head 42 is slidable, it is removed from the piercing element 33 to permit a fowl to be pierced by the piercing element. The prong head 42 is then put back on the piercing element and slid towards the prong head 41 so as to grip the fowl from opposite ends.

I have provided a spring 43 fastened to the prong head 42 by a rivet 44 and extending lengthwise of the piercing element 33. The free end of the spring 43 presses against the piercing element and clamps the prong head 42 to said element. The prong head 42 may thus be slidably adjusted on the piercing element so as to positively grip a fowl 45 from opposite ends.

I have provided cut-out portions or notches 48, 48 in the upper surfaces of the plates 24, 25 for supporting a skewer 49 having a handle 50. In use, the handle extends out of the container 11 for manipulation by the user. A plate 51 on the skewer and near one end of the handle prevents shifting or sliding motion of the skewer.

It will thus be seen that this appliance includes an elongated piercing element having one end 38 of non-circular cross-section for interlocking engagement in the opening 32, and having a tapering end 46 of circular cross-section forming a journal which rotates in the recess 40.

Figure 2:
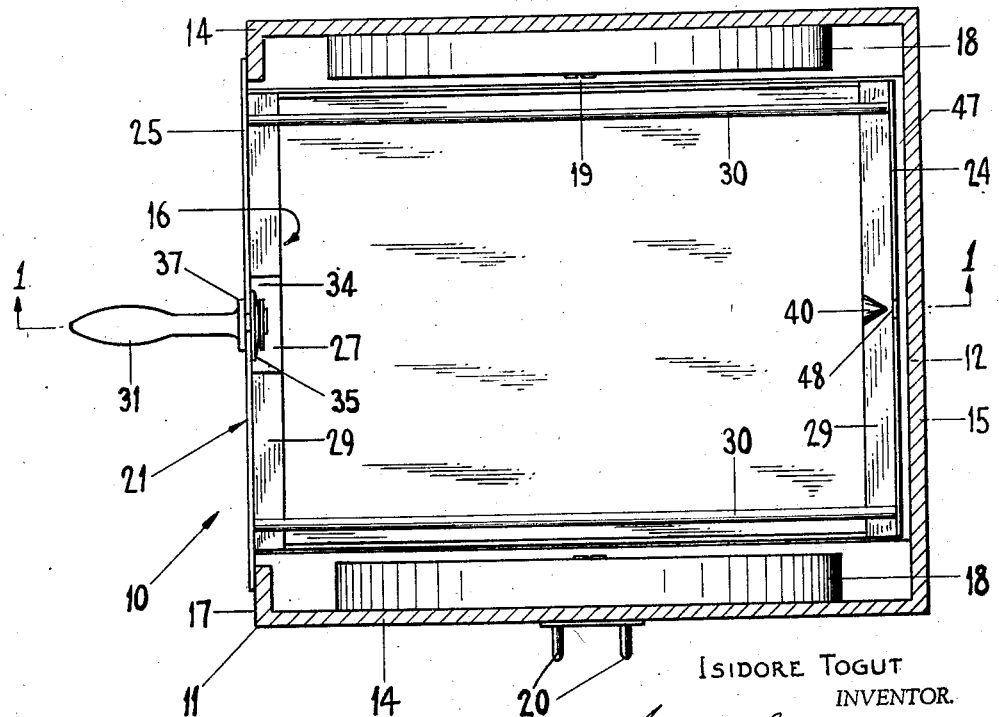
Figure 2 is a cross-sectional plan view of the device, the section being taken as on line 2—2 in Figure 1.

As shown in Figures 1 and 2, the bottom 12 has a rectangular guideway 47 parallel with the heating elements 18 and of slightly larger width than the tray 21 to cause alined movement of the tray into and out of the casing 11 without touching the heating elements.

In accordance with the patent statutes I have described and illustrated the preferred embodiment of my invention, but it will be understood that various changes and modifications can be made therein without departing from the spirit of the invention as defined by the appended claims.

I claim:

1. A combined electric oven and barbecue-type broiler comprising in combination, a container having an opening at one end and having electric heating elements vertically secured on opposite walls thereof, a tray having a drip pan and two vertical plates, one of said plates being adapted to substantially close said opening except an upper vent for exit of vapor from said oven, said plates having brackets facing each other, said closure plate having a hollow handle rotatably mounted centrally thereof, said handle being frictionally held on said plate, a skewer having one end thereof adapted to be gripped in said hollow handle, one of said brackets having a central recess to receive the other end of said skewer, whereby a fowl may be secured to said skewer and rotatably adjusted to various angular positions and frictionally held in said adjusted positions, said fowl remaining supported when inside or when moved outside of said container for inspection, said fowl being supported equidistant between said heating elements and being broiled simultaneously and equally from opposite sides.

2. A combined electric oven and barbecue-type broiler comprising a container having an opening at one end and having electric heating elements vertically secured on opposite walls thereof, a tray having a drip pan and two vertical plates, one of said plates being adapted to substantially close said opening except an upper vent for exit of vapor from said oven, said plates having brackets facing each other, said closure plate having a hollow handle rotatably mounted centrally thereof, said handle being frictionally held on said plate, a skewer having one end thereof adapted to be gripped in said hollow handle, one of said brackets having a central recess to receive the other end of said skewer in supporting relation, said skewer in position inside said broiler being disposed in front and parallel to said heating elements, whereby a fowl may be secured to said skewer and rotatably adjusted to various angular positions and frictionally held in said adjusted positions, said fowl remaining supported when inside or when moved outside of said container for inspection, said fowl being supported equidistant between said heating elements and being broiled simultaneously and equally from opposite sides.

3. A combined electric oven and barbecue-type broiler comprising a container having an opening at one end and having electric heating elements secured on opposite walls thereof, a tray having a drip pan and two vertical plates, one of said plates being adapted to substantially close said opening except an upper vent for exit of vapor, said plates having aligned sets of brackets, said closure plate having a hollow handle rotatably mounted thereon, said handle being resiliently held in frictional engagement on said plate, an elongated piercing element having one end thereof adapted to be gripped in alined and supporting relation in said hollow handle, one of said brackets having a central recess to receive the other end of said piercing element in horizontal position inside said broiler, said piercing element being disposed in parallel relation with said heating elements, whereby a fowl may be secured to said piercing element and rotatably adjusted to various angular positions and frictionally held in said adjusted positions while being broiled, said fowl remaining supported when inside or when moved outside of said container for inspection, said fowl being supported equidistant between said heating elements and being broiled simultaneously and equally from opposite sides.

4. In a combined electric oven and barbecue-type broiler comprising a container having an opening at one end and having electric heating elements secured on opposite walls thereof, a tray having two vertical plates, one of said plates being adapted to substantially close said opening, said plates having aligned sets of brackets, said closure plate having a hollow handle rotatably mounted thereon, said handle being resiliently held in frictional engagement on said plate, an elongated piercing element having one end thereof adapted to be gripped in aligned and supporting relation in said hollow handle, one of said brackets having a central recess to receive the other end of said piercing element in horizontal position inside said broiler, said piercing element being disposed in parallel relation with said heating elements, whereby a fowl may be secured to said piercing element and rotatably adjusted to various angular positions and frictionally held in said adjusted positions while being broiled, said piercing element having longitudinally adjustable prong means for positively gripping said fowl at opposite ends, said fowl remaining supported when inside or when moved outside of said container for inspection, said fowl being supported equidistant between said heating elements and being broiled simultaneously and equally from opposite sides.

5. A combined electric oven and barbecue-type broiler comprising in combination, a container having an opening at one end and having electric heating elements vertically secured on opposite walls thereof, a tray having a drip pan and two vertical plates, one of said plates being adapted to substantially close said opening except an upper vent for exit of vapor from said oven, said plates having brackets facing each other, said closure plate having a handle thereon, a skewer supported by said tray whereby meats may be secured to said skewer and rotatably adjusted to various angular positions on said tray, said meats remaining supported when inside of said container or when moved outside of said container for inspection.

ISIDORE TOGUT.